(No Model.)
M. WHELESS.
ELECTRIC RAILWAY SYSTEM.
No. 441,219. Patented Nov. 25, 1890.
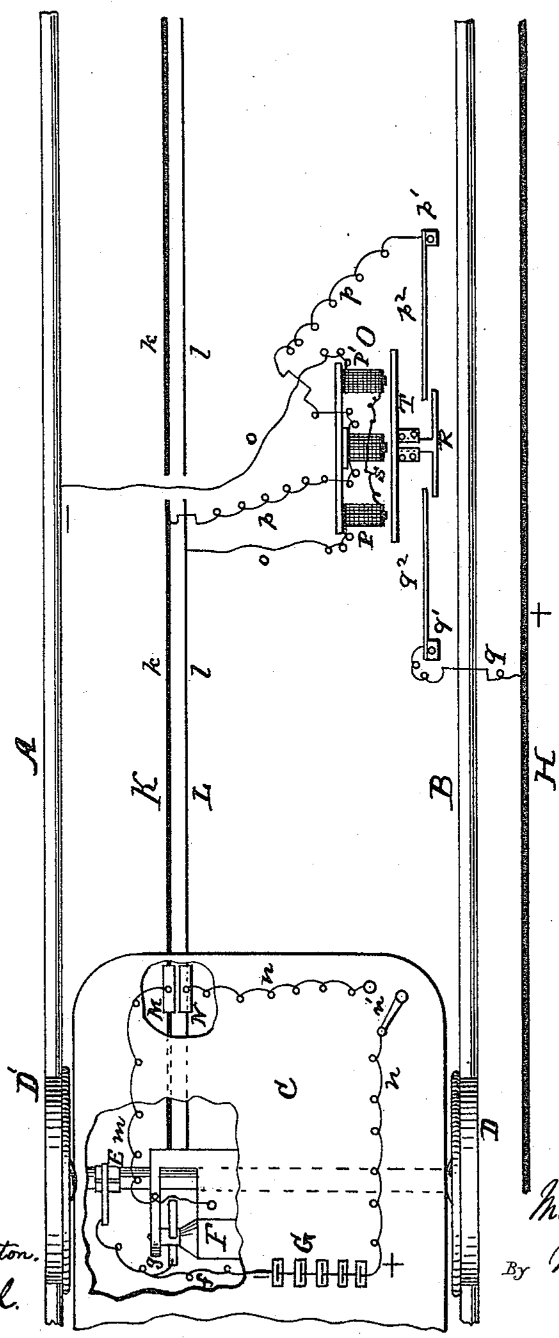
Witnesses
Thos. Houghton.
M. E. Cowell.
Inventor
Malone Wheless
By W. H. Singleton.
his Attorney
THE NORRIS PETERS CO., PHOTO-LITHO., WASHINGTON, D. C.

UNITED STATES PATENT OFFICE.

MALONE WHELESS, OF NASHVILLE, TENNESSEE, ASSIGNOR TO THE WHELESS ELECTRIC RAILWAY COMPANY, OF ALEXANDRIA, VIRGINIA.

ELECTRIC-RAILWAY SYSTEM.

SPECIFICATION forming part of Letters Patent No. 441,219, dated November 25, 1890.

Application filed July 21, 1890. Serial No. 359,387. (No model.)

*To all whom it may concern:*

Be it known that I, MALONE WHELESS, a citizen of the United States, residing at Nashville, in the county of Davidson and State of Tennessee, have invented certain new and useful Improvements in Electric-Railway Systems; and I do declare the following to be a full, clear, and exact description of the invention, such as will enable others skilled in the art to which it appertains to make and use the same, reference being had to the accompanying drawing, and to the letters of reference marked thereon, which forms a part of this specification.

The figure represents in plan view the system applied to a railway.

The invention relates to improvements in electric-railway systems, more especially to a system wherein there is an insulated prime conductor, a bare trolley-line in sections, switches between the two, and a local circuit carried by the car which operates the switches.

The object of the present invention is to simplify the construction by rendering some of the insulation unnecessary, as will be hereinafter explained, and this is done by the use of two trolley-lines, as will be explained.

The invention consists in the construction hereinafter set forth.

In the annexed drawing, the letters A and B indicate two lines of track-rails, which are to be continuously connected, so as to form electric conductors. The car C is supported upon wheels D D′, which are not insulated from the axle E. On this car are placed the motor F and a battery G. Both the motor and battery are connected on the negative side by the wires $f$ and $g$ with the axle. Along the track runs the continuous insulated power-line H. In the conduit are placed two bare working-conductors or trolley-wires K and L in sections $k$ and $l$, insulated from one another. Entering the conduit and bearing on these trolley-wires are the two trolleys M and N, the former bearing on the wire K, the latter on the wire L. The trolley M is connected by a wire $m$ with the motor and the trolley N with the battery by a wire $n$, in which there is a switch $n'$. For each pair of sections $k$ and $l$ there is placed the electro-magnetic switch O. From the section $l$ a wire $o$ runs around the magnets P P′ and to the line of rails A. From the section $k$ a wire $p$ runs to the magnet S and thence to the post $p'$. The posts $p'$ and $q'$ have the spring contact-plates $p^2$ and $q^2$, and from the post $q'$ the wire $q$ runs to the power-line H. At the break between the contact-plates $p^2$ and $q^2$ is the contact-maker R, carried by the armature T. When the switch $n'$ is closed, the current of the local circuit flows through wire $n$, trolley N, section $l$, wire $o$, magnets P P′, wire $o$, rail-line A, wheel D′, axle E, wire $f$, to battery. The vitalization of magnets P P′ draws up the armature T, and it is further held up by magnet $s$ after this is vitalized by the main or power current passing around it, as will be described. This drawing up of the armature T closes the break at the plates $p^2$ and $q^2$. The power-current then passes from the power-line H, through wire $q$, post $q'$, plate $q^2$, contact-maker R, plate $p^2$, post $p'$, wire $p$, magnet S, wire $p$, trolley-line section $k$, trolley M, wire $m$, the motor F, wire $g$, axle E, wheel D′, rail-line A to ground.

Having thus described my invention, what I claim is—

The combination of an insulated power-line, a bare working-conductor or motor trolley-line in insulated sections, a bare local-circuit trolley-line in insulated sections, a car provided with a motor and a battery, a trolley in electrical connection with the motor and the motor trolley-line, another trolley in electrical connection with the battery and the local-circuit trolley-line, an electro-magnetic switch between the power-line and working-conductor, the local circuit being in electrical connection with the magnet of said switch, as set forth.

In testimony whereof I affix my signature in presence of two witnesses.

MALONE WHELESS.

Witnesses:

J. SHERMAN PATRICK,
GRAHAM L. GORDON.